United States Patent [19]
Ueda et al.

[11] Patent Number: 5,886,493
[45] Date of Patent: Mar. 23, 1999

[54] SYNCHRONOUS MACHINE EXCITATION CONTROL DEVICE FOR ABSORBING HARMONICS SUPERPOSED ONTO FUNDAMENTAL CURRENT

[75] Inventors: Yoshisuke Ueda, Shiga; Fuyuto Takase, Kyoto; Kiyoshi Oku, Osaka; Takayuki Hira; Atsushi Ashizawa, both of Kanagawa, all of Japan

[73] Assignees: The Kansai Electric Power Co., Inc., Osaka; Fuji Electric Co., Ltd., Kawasaki, both of Japan

[21] Appl. No.: 599,684

[22] Filed: Mar. 12, 1996

[30] Foreign Application Priority Data

Feb. 16, 1995 [JP] Japan .................................. 7-027884

[51] Int. Cl.⁶ .................................................. G05B 11/01
[52] U.S. Cl. .......................... 318/611; 318/629; 318/721
[58] Field of Search ................................... 318/611, 649, 318/800–817, 629, 720–724

[56] References Cited

U.S. PATENT DOCUMENTS

| | | | |
|---|---|---|---|
| 4,137,489 | 1/1979 | Lipo ........................................ | 318/798 |
| 4,736,143 | 4/1988 | Nakamura et al. ...................... | 318/432 |
| 5,016,157 | 5/1991 | Rozman et al. ......................... | 363/39 |
| 5,023,924 | 6/1991 | Tajima et al. ........................... | 388/811 |
| 5,126,641 | 6/1992 | Putman et al. .......................... | 318/128 |
| 5,274,313 | 12/1993 | Amrhein ................................ | 318/629 |
| 5,334,923 | 8/1994 | Lorenz et al. .......................... | 318/805 |
| 5,392,607 | 2/1995 | Wu .............................................. | 62/6 |
| 5,410,228 | 4/1995 | Shibata et al. .......................... | 318/432 |
| 5,426,720 | 6/1995 | Bozich et al. ............................ | 395/22 |
| 5,481,172 | 1/1996 | Minowa et al. ........................ | 318/800 |
| 5,510,689 | 4/1996 | Lipo et al. ............................... | 318/809 |
| 5,559,421 | 9/1996 | Miyakawa ................................ | 322/58 |
| 5,594,630 | 1/1997 | Baker ....................................... | 363/40 |
| 5,636,193 | 6/1997 | Ohmi ................................... | 318/611 X |

FOREIGN PATENT DOCUMENTS

| | | |
|---|---|---|
| 5137400 | 6/1993 | Japan . |
| 5292718 | 11/1993 | Japan . |
| 5336665 | 12/1993 | Japan . |

*Primary Examiner*—Brian Sircus
*Attorney, Agent, or Firm*—Greer, Burns & Crain, Ltd.

[57] ABSTRACT

An excitation control device controls excitation of a synchronous machine so as to absorb the harmonic current of a specified order superposed onto the current flowing between an electric power system to the synchronous machine.

A harmonic detector selectively passes a harmonic component of the order of $6n\pm1$ in the detection signal detected by a current transformer. A pass signal of the harmonic detector is. 3-phase/2-phase converted by a rotating coordinate circuit into components on the orthogonal 2 axes on the rotating coordinate system rotating at an angular frequency of a fundamental current of the electric power system. At this time, the pass signal is calculated as a $6n$-order harmonic current represented by the components on the normal two axes. The obtained $6n$-order harmonic current is retrieved through a $6n$-order harmonic filter, amplified by a power amplifier, and provided as an excitation current for the synchronous machine. Using the excitation current, a current having the same amplitude as, but opposite phase to, the harmonic current of the order of $6n\pm1$ flows as an armature current in the synchronous machine. Thus, the harmonic current of the specified order superposed onto the system current can be canceled.

17 Claims, 6 Drawing Sheets

SYNCHRONOUS MACHINE EXCITATION CONTROL DEVICE FOR ABSORBING HARMONICS SUPERPOSED ONTO FUNDAMENTAL CURRENT

BACKGROUND OF THE INVENTION

1. Field of the Invention

The present invention relates to an excitation control device for absorbing specified order harmonics superposed onto a fundamental current of an alternating current (AC) system in a synchronous machine linked to the AC system.

2. Description of the Related Art

The conventional synchronous machine excitation control device provides an excitation winding of an object synchronous machine with a direct current controlled such that the component of the fundamental current in the output voltage of the synchronous machine indicates a predetermined value.

However, the synchronous machine connected to an electric power system and controlled by the conventional excitation control device has no function of absorbing a harmonic current generated in the power system. As a result, there has been a problem of the harmonic current flowing into the synchronous machine a which current is correspondingly generated in an armature winding of the synchronous machine, thereby distorting the output voltage of the armature winding. Furthermore, a negative-phase current generated by the distortion of the system voltage flows through other apparatuses, including the synchronous machine, connected to the electric power system. This may cause various problems such as over-heating, insufficient output, etc for the apparatus.

SUMMARY OF THE INVENTION

Under such circumstances, the present invention aims at providing an excitation control device, capable of absorbing a specified order component of the harmonic current generated in the electric power system, for a synchronous machine connected to the electric power system.

To attain this, the synchronous machine excitation control device according to the present invention is designed as follows.

The device according to the present invention is an excitation control device for controlling the excitation of a 3-phase rotating field synchronous machine connected to the electric power system so that a specified order harmonic component on the system current can be absorbed. The excitation control device is used for exciting the synchronous machine so as to generate a fundamental wave voltage and a harmonic wave voltage which absorbs the harmonic current. The source of the harmonic current may be connected to the electric power system in parallel to the 3-phase rotating field synchronous machine. The excitation control device receives a detection signal of the rotation phase of a spin axis (or rotor axis) interlocking at the position of an excitation pole (or a magnetic pole) of the synchronous machine as a rotation phase detection signal. The excitation control device comprises a harmonic detector for detecting the specified order harmonic component as a harmonic detection signal. According to the rotation phase detection signal and harmonic detection signal, the excitation control device calculates the value of a synchronous machine excitation current required to obtain the armature current of the synchronous machine having the same amplitude as and an opposite phase to, the specified order harmonic component.

The calculated excitation current causes the excitation in the synchronous machine. As a result, a current in which the specified order harmonic component of the system current is absorbed flows through the armature of the synchronous machine.

The excitation control device may comprise a rotating coordinate converter for 3-phase/2-phase-converting the harmonic detection signal detected as a 3-phase detection signal by the harmonic detector into orthogonal 2-axis components in the rotating coordinates rotating at the angular frequency of the fundamental current of the electric power system. The excitation current is controlled so as to have a harmonic current having the amplitude, that is a proportional value of a vector sum of the negative-phase components of the orthogonal 2-axis components, and rotating at an angular frequency indicating a difference of an order of 1 (one) from an angular frequency of the specified order harmonic component on the rotating coordinate system.

The excitation control device may further comprise an integrating unit for receiving an output signal of the rotating coordinate converter, storing as storage values both the amplitude and the phase of the output signal received from the rotating coordinate converter, and modifying the storage values by adding to the storage values respectively the amplitude and phase of the output signal sequentially calculated at predetermined time intervals. A waveform memory is also included in the excitation control device for storing the waveform of the modified output signal for one cycle and reading the contents of the stored waveform in synchronism with the rotation phase of the rotation phase detection signal. Accordingly a D/A converting unit is included for D/A-converting an output signal of the waveform memory and outputting it as the excitation current.

The control device may further comprise an A/D converting unit for A/D-converting the current flowing between the synchronous machine and electric power system and outputting it as a current detection signal to the harmonic detector. The harmonic detector may comprise a Fourier transform unit for receiving the current detection signal and the rotation phase detection signal, and performing a predetermined expansion operation based on the detected rotation phase. Thus, the harmonic detector separates the specified order harmonic component from the current detection signal.

The specified order harmonic component may be the current of the order of $6n\pm1$ of the fundamental wave of the electric power system, and the excitation current may be the current of the order of $6n$.

The method according to the present invention is for controlling the excitation of a rotating field synchronous machine connected to an electric power system, and includes the steps of detecting a specified harmonic component superposed onto the system current flowing between the electric power system and the synchronous machine as a harmonic detection signal; detecting as a rotation phase detection signal the rotation phase of a spin axis which rotates with the position of the excitation pole of the synchronous machine; and controlling an excitation current of an synchronous machine such that an armature current having the same amplitude as, but an opposite phase to, the specified harmonic component flows in the synchronous machine according to the harmonic detection signal and rotation phase detection signal.

The method according to the present invention may further include the steps of outputting an output signal after 3-phase/2-phase-converting the harmonic detection signal detected as a 3-phase detection signal into orthogonal 2-axis components in the rotating coordinates rotating at the angular frequency of a fundamental current of the electric power system; and controlling the excitation current such that the excitation current has a harmonic current having the amplitude that is a proportional value of a vector sum of negative-phase components of the orthogonal 2-axis components, and rotating at an angular frequency indicating a difference of an order of 1 (one) from an angular frequency of the specified harmonic component on the rotating coordinate system.

The method according to the present invention may further include the steps of storing as storage values both amplitude and phase of the output signal; modifying the storage values by adding to the storage values respectively the amplitude and phase of the output signal sequentially calculated at predetermined time intervals; storing the waveform of the modified output signal for one cycle; reading the contents of the stored waveform in synchronism with the rotation phase; D/A-converting the stored and read contents; and outputting the contents as the excitation current.

The method according to the present invention may further include the steps of A/D-converting a current flowing between the synchronous machine and the electric power system and outputting it as a current detection signal; and performing a predetermined expansion operation to the current detection signal based on the detected rotation phase, thereby separating the specified harmonic component from the current detection signal.

In the control method of the present invention, the specified harmonic component may be the current of the order of $6n\pm1$ of the fundamental current of the electric power system, and the excitation current may be the current of the order of $6n$.

DESCRIPTION OF THE PREFERRED EMBODIMENT

Figure 1:
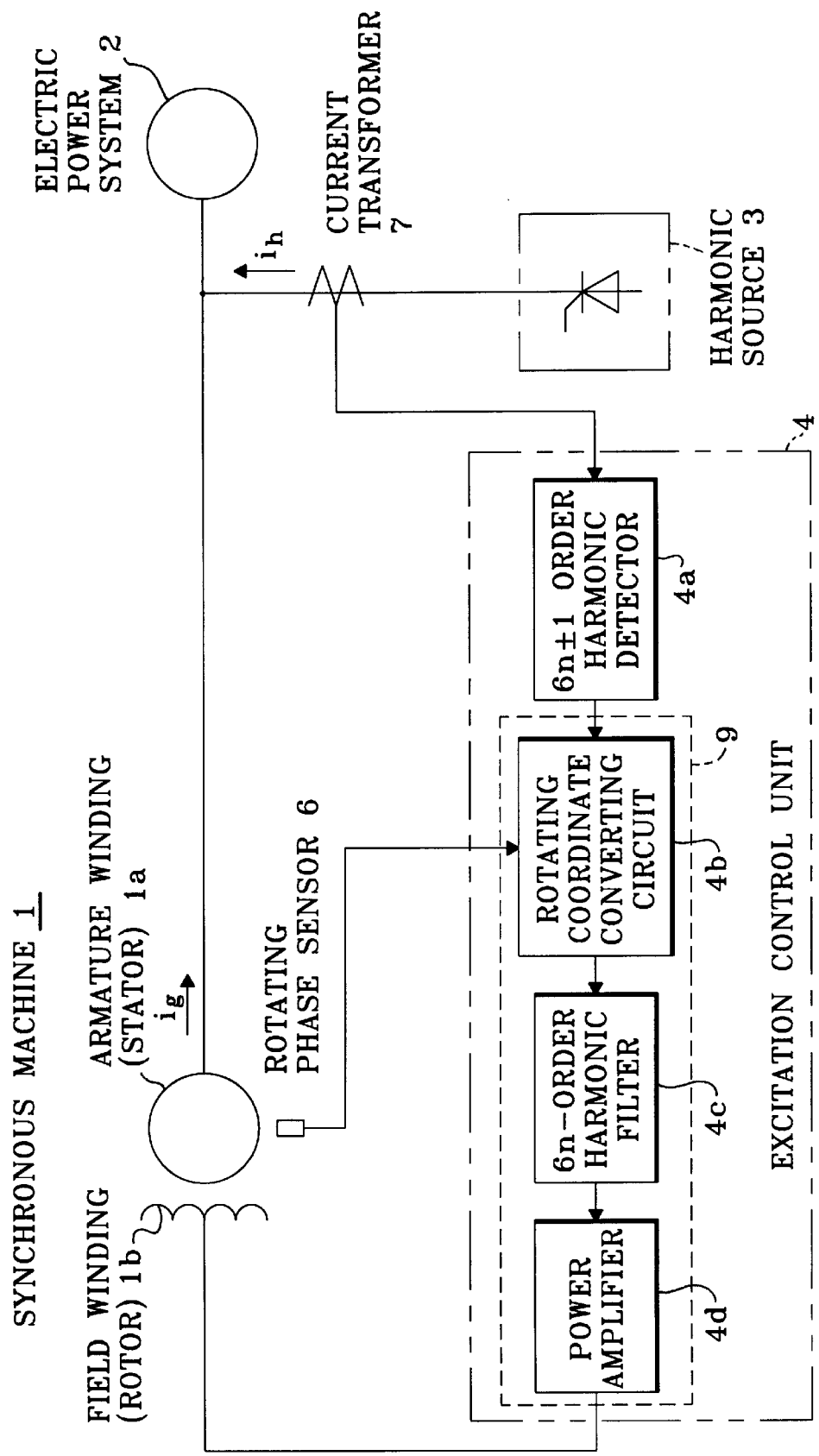
FIG. 1 shows the circuit of the synchronous machine excitation control system according to the first embodiment of the present invention.

The basic principle of the present invention is described below. Practically, the control of reducing the $(6n\pm1)$ f harmonic (f refers to the frequency of the fundamental current), which is the most outstanding harmonic component generated in the system, is described as an example.

Normally, when the field winding of the 3-phase rotating field synchronous machine is excited with the harmonics rotating field of the order $6n$ ($6nf$) for the fundamental current angular frequency, the harmonics of the order $6n\pm1$ (($6n\pm1$) f) are generated in the armature winding of the synchronous machine.

In the synchronous machine which is connected to an electric power system and is in a balanced state, the harmonics of the order $6n+1$ generated in the system form a rotating field in the positive direction in the synchronous machine while the harmonics of the order $6n-1$ form the rotating field in the negative direction in the synchronous machine. These rotating fields are respectively assigned the orders $6n+1$ and $6n-1$ when viewed from the stator (or armature) of the synchronous machine, while they are the rotating fields of the order $6n$ in the positive and negative directions respectively when viewed from the rotor (or rotating field), thereby generating the harmonic of the order $6n$ at the field winding of the rotor.

Therefore, each harmonics of the order $6n\pm1$ at the system can be reduced by controlling the amplitude and phase of the harmonic current of the order $6n$ applied to the field winding, such that the harmonic of the order $6n+1$ or $6n-1$ generated at the armature of the synchronous machine when the field winding of the synchronous machine is excited with the harmonic current of the order $6n$ have the same amplitude of, but an opposite phase to, the harmonic at the system.

As described above, the excitation control device according to the present invention controls the harmonic current running through the field winding by exciting the field winding of the 3-phase rotating field synchronous machine connected to the electric power system using the harmonic current of the order $6n$ such that the harmonic voltage or harmonic current of the order $6n\pm1$ generated at the armature winding has the same amplitude as, but an opposite phase to, the harmonic voltages or harmonic current of the order $6n\pm1$ generated at the system.

The harmonic current of the order $6n\pm1$ is 3-phase/2-phase-converted onto the rotating coordinate system rotating at the angular frequency of the fundamental current and the excitation current is calculated based on the conversion result according to the following equations.

If the harmonic current components in the electric power system, that is, the current component absorbed by the 3-phase rotating field synchronous machine are the harmonic currents of the orders 5 and 7, that is, the harmonic currents of the order $6n\pm1$ (where n=1), then the harmonic currents $i_{ah}$, $i_{bh}$, and $i_{ch}$ corresponding to each of the phases a, b, and c can be calculated by the following equations.

$$i_{ah}=I_5 \sin(5\omega t+\angle I_5)+I_7 \sin(7\omega t+\angle I_7) \; i_{bh}=I_5 \sin(5\omega t+\angle I_5+2\pi/3)+I_7 \sin(7\omega t+\angle I_7-2\pi/3) \; i_{ch}=I_5 \sin(5\omega t+\angle I_5-2\pi/3)+I_7 \sin(7\omega t+\angle I_7+2\pi/3) \quad (1)$$

where $I_5$ and $I_7$ indicate the peak values of the harmonic currents of the orders 5 and 7; $\angle I_5$ and $\angle I_7$ are phase angles of the harmonic currents corresponding to the peak values $I_5$ and $I_7$; and $\omega$ indicates the angular frequency of the fundamental current.

Each of the harmonic currents $i_{ah}$, $i_{bh}$, and $i_{ch}$ is 3-phase/2-phase-converted, according to the following determinant (2), on the rotating coordinate rotating at the angular frequency $\omega$ of the fundamental harmonic indicated by d and q axes normal to each other.

$$\begin{vmatrix} i_{dh} \\ i_{qh} \end{vmatrix} = 2/3 \begin{vmatrix} \cos\omega t & \cos(\omega t - 2\pi/3) & \cos(\omega t + 2\pi/3) \\ -\sin\omega t & -\sin(\omega t - 2\pi/3) & -\sin(\omega t + 2\pi/3) \end{vmatrix} \begin{vmatrix} i_{ah} \\ i_{bh} \\ i_{ch} \end{vmatrix} \quad (2)$$

where $i_{dh}$ and $i_{qh}$ respectively indicate the d-axis and q-axis components of the current vectors converted on the rotating coordinate system.

If the origin of the time t in equation (2) is defined as the moment when the d-axis of the rotor (field) of the synchronous machine matches the a-phase winding axis of the rotor (armature), then $i_{dh}$ and $i_{qh}$ are converted onto the coordinate system according to equation (3) using equations (1) and (2).

$$i_{dh}=I_5 \sin(6\omega t+\angle I_5)+I_7 \sin(6\omega t+\angle I_7) \; i_{qh}=I_5 \cos(6\omega t+\angle I_5)-I_7 \cos(6\omega t+\angle I_7) \quad (3)$$

Equation (3) can be represented by equation (4).

$$i_{dh}=I_{d6} \sin(6\omega t+\angle I_{d6}) \; i_{qh}=I_{q6} \sin(6\omega t+\angle I_{q6}) \quad (4)$$

where $i_{d6}$ ($i_{dh}$, h=6) and $i_{q6}$ ($i_{qh}$, h=6) respectively indicate the d-axis and q-axis components of the harmonic current vectors of the order 6 in the rotating coordinate system.

If the d-axis and q-axis components of the armature current $i_g$ generated by the field current $i_f$, in where the d-axis and q-axis components are respectively $i_{fd}$ and $i_{fq}$, are represented by $i_{dg}$ and $i_{qg}$ respectively in the rotating coordinate system, then $i_{dg}$ and $i_{qg}$ are regulated by the following equation (5).

$$i_{dg}=K \cdot i_{fd} \; i_{qg}=K \cdot i_{fq} \quad (5)$$

where K indicates the winding ratio of the field winding to the armature winding in the synchronous machine. It is assumed that the armature voltage of the synchronous machine does not include waveform distortion.

To have the synchronous machine absorb the harmonic current of the system represented by equation (4) above, both equations $i_{dg}+i_{dh}=0$ and $i_{qg}+i_{qh}=0$ should be defined. Accordingly, the following equation (6) should be defined based on equations (4) and (5).

$$i_{dg}+i_{dh}=0 \; \therefore i_{fd}=I_{d6} \sin(6\omega t+\angle I_{d6}+\pi)/K \; i_{qg}+i_{qh}=0 \; \therefore i_{fq}=I_{q6} \sin(6\omega t+\angle I_{q6}+\pi)/K \quad (6)$$

If the field winding of the synchronous machine is excited using as a required current the harmonic current of the order 6 represented by equation (6), then both harmonic currents of the orders 5 and 7 in the electric power system represented by equations (1) through (4) can be cancelled. Unnecessary harmonic components can be absorbed in the synchronous machine by providing the above described excitation control for the synchronous machine.

The first and second embodiments of the present invention are described by referring to FIGS. 1 through 7. The components shown in these figures and having the same functions are assigned the same reference numbers.

Figure 2:
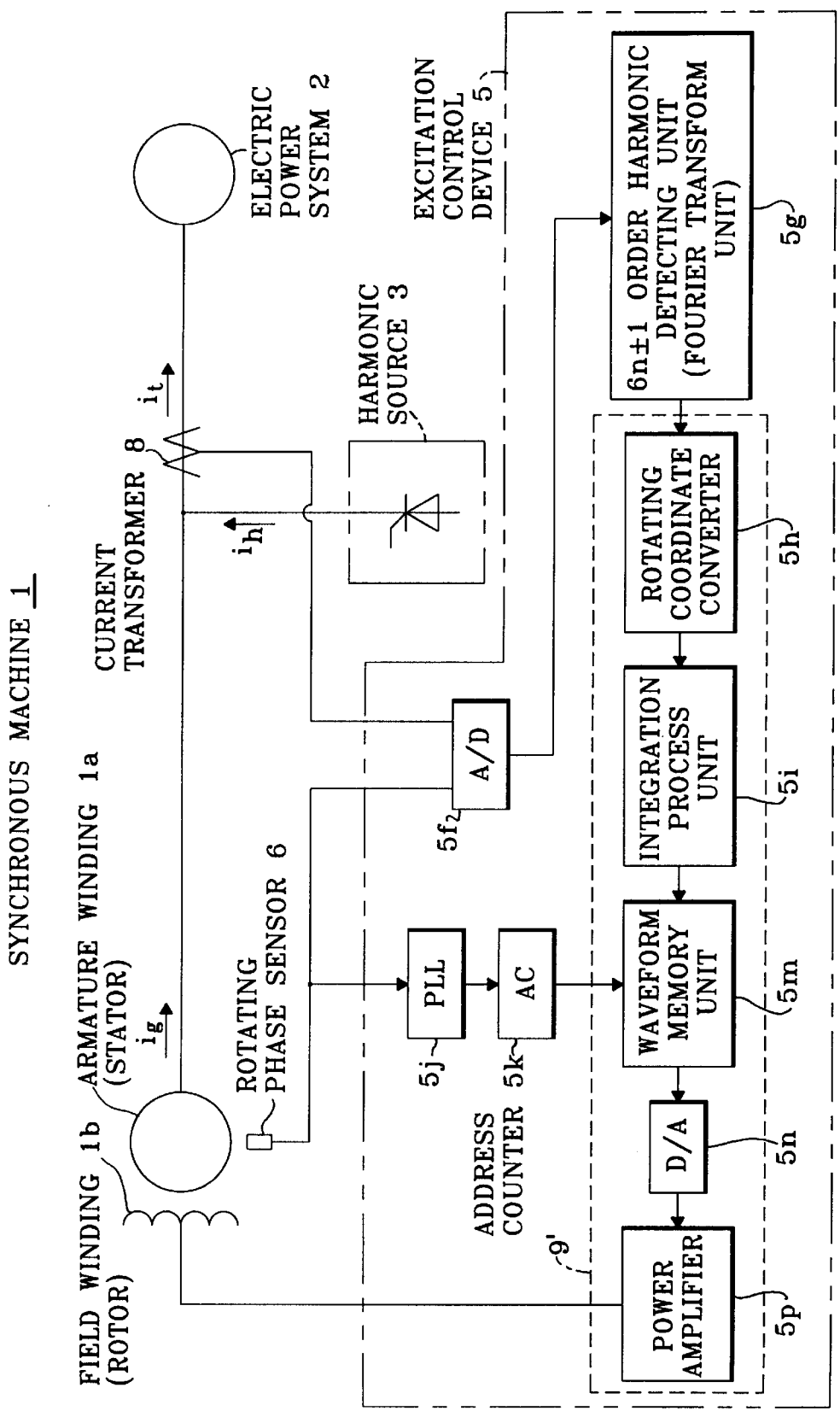
FIG. 2 shows the circuit of the synchronous machine excitation control system according to the second embodiment of the present invention.

FIG. 1 shows the circuit according to the first embodiment of the present invention. FIG. 2 shows the circuit according to the second embodiment of the present invention. The first and second embodiments relate to the excitation control device for generating the 6n order harmonic excitation current when the object of a current to be absorbed in the synchronous machine is a 6n±1 order system harmonic current.

Figure 3:
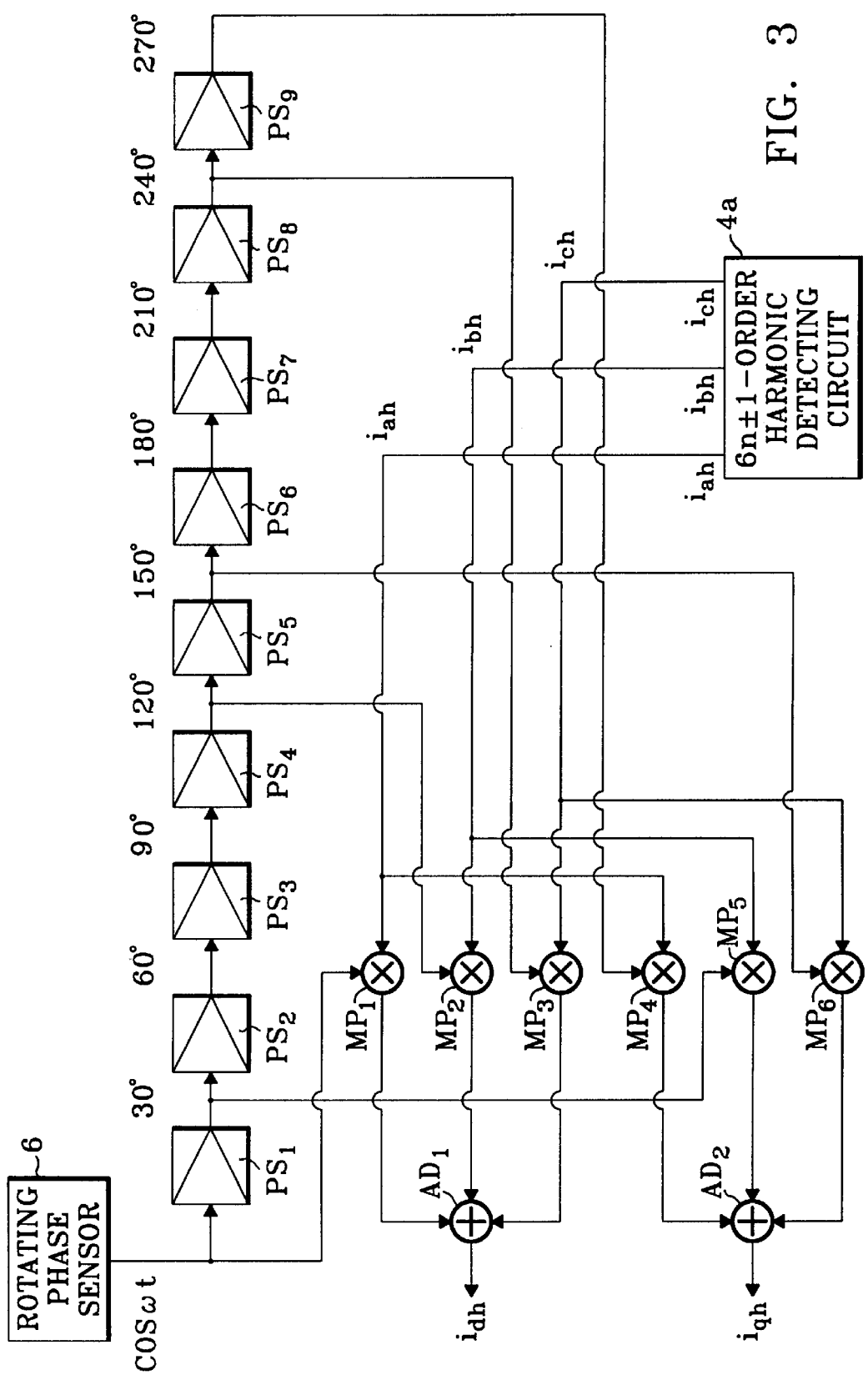
FIG. 3 shows the rotating coordinate converting circuit shown in FIGS. 1 and 2.
Figure 4:
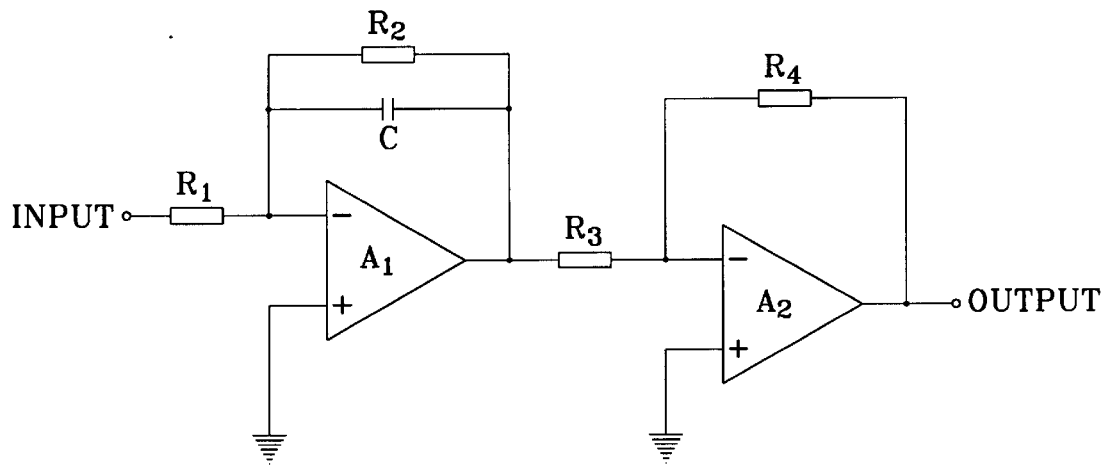
FIG. 4 shows the circuit of the phase shifter shown in FIG. 3.
Figure 5:
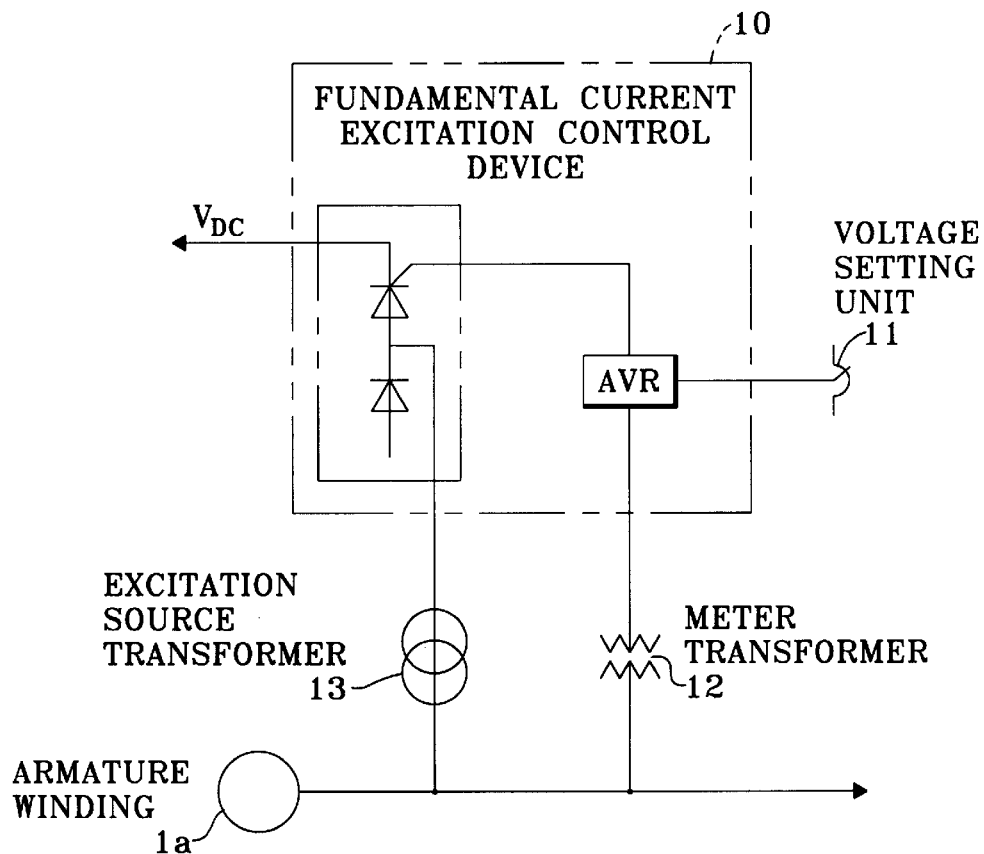
FIG. 5 shows the circuit of the fundamental current excitation control system for generating the fundamental current voltage in the synchronous machine according to the present embodiment.
Figure 6:
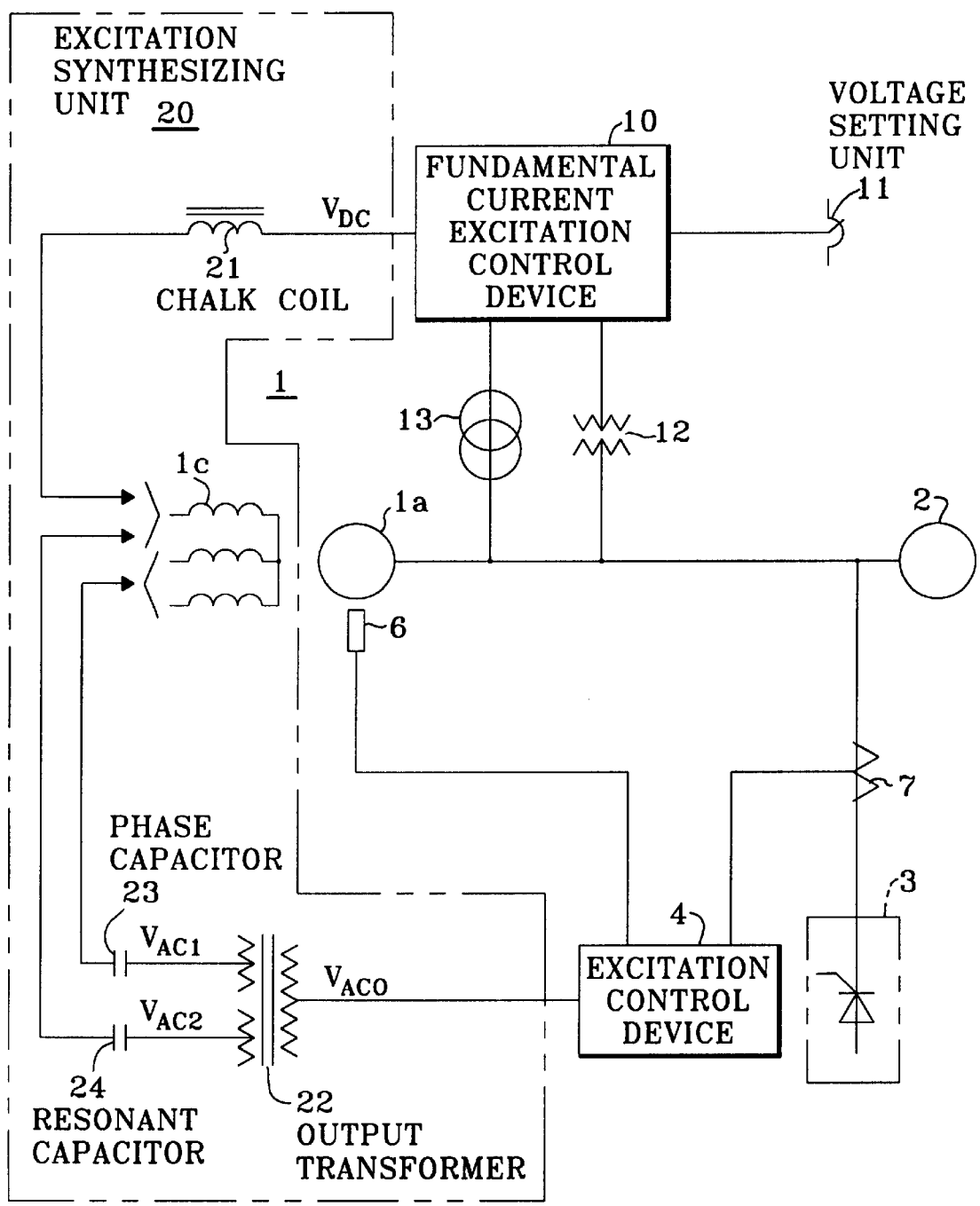
FIG. 6 shows the circuit of the fundamental current excitation control system and harmonic excitation control system.
Figure 7:
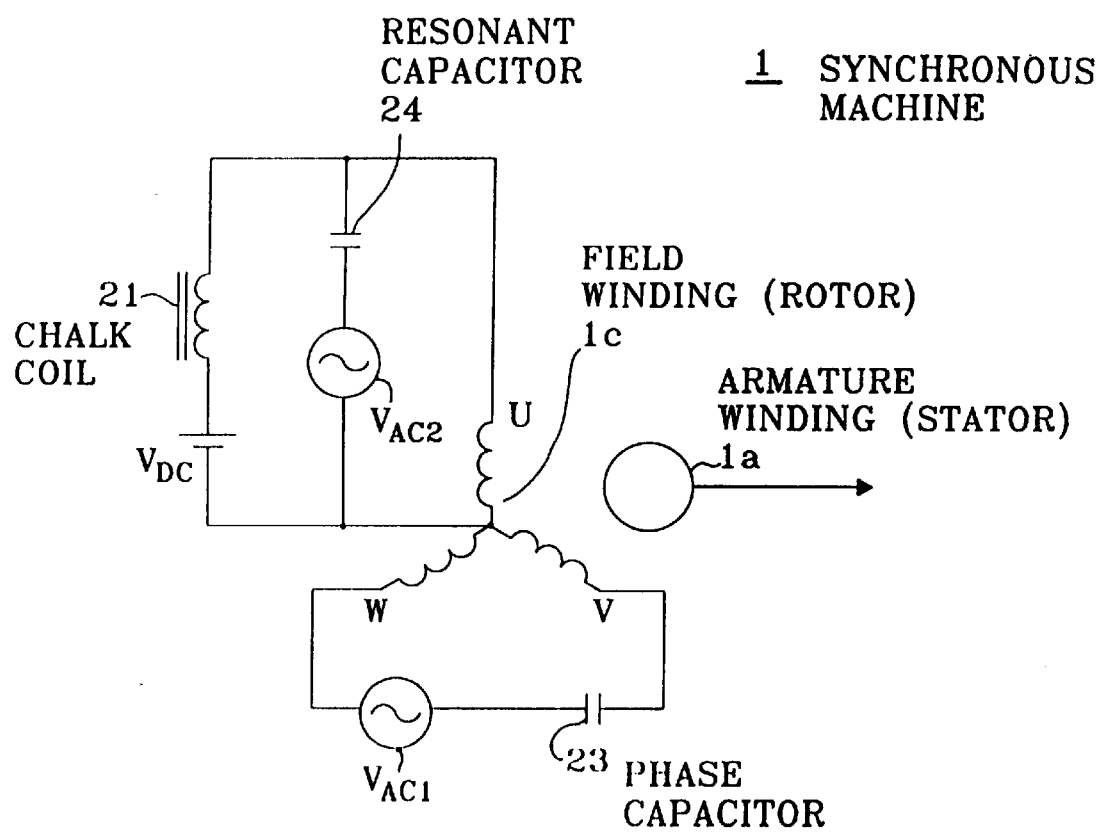
FIG. 7 shows the circuit of the excitation synthesizing system for the synchronous machine according to the present embodiment.

FIG. 3 shows rotating coordinate converting circuit shown in FIGS. 1 and 2; FIG. 4 shows the circuit of the phase shifter shown in FIG. 3; FIG. 5 shows the circuit of the fundamental current excitation control system for generating the fundamental current; FIG. 6 shows the circuit of the excitation system for absorbing harmonics in the 3-phase rotating field synchronous machine, which is a combination of the fundamental current excitation control system shown in FIG. 5 and the harmonic excitation control system shown in FIGS. 1 and 2; and FIG. 7 shows the circuit of the excitation synthesizing system for synthesizing the output from the fundamental current excitation control system and the harmonic excitation control system.

As shown in FIG. 1, the system according to the present embodiment comprises a 3-phase rotating field synchronous machine 1 which is capable of absorbing a harmonic current and comprising an armature winding 1a in the stator of the synchronous machine 1 and a field winding 1b for generating the harmonic rotating field in the rotor of the synchronous machine 1; an electric power system 2; a rotating phase sensor 6 for detecting the phase of the spin axis interlocking at the excitation pole position of the synchronous machine 1; a current transformer 7; and excitation control device 4 for controlling the excitation of the synchronous machine 1. A harmonic source 3 is connected to the electric power system 2. In FIG. 1, $i_g$ indicates the armature current of the synchronous machine 1, and $i_h$ indicates the output current of the harmonic source 3.

The excitation control device 4 receives a detection signal from the rotating phase sensor 6 and a detection signal from the current transformer 7 which detects the output current of the harmonic source 3, and provides a 6n-order harmonic excitation current for the synchronous machine 1. The excitation control device 4 comprises a 6n±1-order harmonic detector 4a, a rotating coordinate converting circuit 4b, a 6n-order harmonic filter 4c, and a power amplifier 4d. The rotating coordinate converting circuit 4b, 6n-order harmonic filter 4c, and power amplifier 4d form a control unit 9.

The harmonic detector 4a has the band-filter function for selectively passing the harmonic current of the order 6n±1 in the 3-phase output current of the harmonic source 3 detected by the current transformer 7. The output signal is represented by equation (1) where n=1.

The rotating coordinate converting circuit 4b comprises an analog multiplier and an adder to 3-phase/2-phase-convert the harmonic current of the order 6n±1 in the 3-phase output current of the harmonic source 3 shown in equation (1) into the components of the two axes d and q normal to each other in the rotating coordinate system rotating at the angular frequency of the fundamental current of the electric power system. The rotating coordinate converting circuit 4b receives a phase detection signal in the form of a sine wave through the rotating phase sensor 6, performs operations indicated by equations (2) through (5) (when n=1), and outputs a required synchronous machine excitation current according to equation (6). The origin of the time t in equation (1) refers to the point when the d-axis of the rotating field of the synchronous machine matches the a-phase winding axis of the armature.

The 6n-order harmonic filter 4c has the band-filter function for selectively passing a required 6n-order harmonic current from the output signal of the rotating coordinate converting circuit 4b obtained by equation (6). The output of the excitation control device 4 is amplified by the power amplifier 4d into a required 6n-order harmonic excitation current for the synchronous machine 1 and provided for the field winding 1b.

The coefficient K in equations (5) and (6) is set to an appropriate value by adjusting the gain through the rotating coordinate converting circuit 4b and/or power amplifier 4d.

According to the present invention, the absorption control of the harmonic current of the order 6n±1 in the system with the synchronous machine 1 can be a type of feed-forward control in which the amount of the harmonic current of the order 6n±1 selected by the harmonic detector 4a is set to a variable. In this case, the confirmation can be omitted as to whether or not the component not absorbed in the harmonic in the electric power system exists.

FIG. 3 shows the rotating coordinate converting circuit 4b, and FIG. 4 shows the phase shifter shown in FIG. 3.

In FIG. 3, phase shifters $PS_1$ through $PS_9$ provide a predetermined phase difference (30 degrees according to the present embodiment) between input and output signals. Analog multipliers $MP_1$ through $MP_6$ multiplies an input signal by another input signal and outputs the respective products. Analog adders $AD_1$ and $AD_2$ add 3 input signals and output the respective sums.

The output signal (cos ωt) of the rotating phase sensor 6 is output to the phase shifter $PS_1$ and is phase-shifted by 30 degrees by each of phase shifters $PS_1$ through $PS_9$. The output signal of the rotating phase sensor 6 is also output to the multiplier $MP_1$, multiplied by the output signal $i_{ah}$ of the 6n±1-order harmonic detecting circuit 4a, and output to the adder $AD_1$. The output signal from the phase shifter $PS_1$ is output to the multiplier $MP_5$, multiplied by the output signal $i_{bh}$ of the 6n±1-order harmonic detecting circuit 4a, and output to the adder $AD_2$. The output signal from the phase shifter $PS_4$ is output to the multiplier $MP_2$, multiplied by the output signal $i_{bh}$ of the 6n±1-order harmonic detecting circuit 4a, and output to the adder $AD_1$. The output signal from the phase shifter $PS_5$ is output to the multiplier $MP_6$, multiplied by the output signal $i_{ch}$ of the 6n±1-order harmonic detecting circuit 4a, and output to the adder $AD_2$. The output signal from the phase shifter $PS_8$ is output to the multiplier $MP_3$, multiplied by the output signal $i_{ch}$ of the 6n±1-order harmonic detecting circuit 4a, and output to the adder $AD_1$. The output signal from the phase shifter $PS_9$ is output to the multiplier $MP_4$, multiplied by the output signal $i_{ah}$ of the 6n±1-order harmonic detecting circuit 4a, and output to the adder $AD_2$. The output signals $i_{d6}$ ($i_{dh}$) of the adder $AD_1$ and the output signal $i_{q6}$ ($i_{qh}$) of the adder $AD_2$ are output to the 6n-order harmonic filter 4c.

With the above described configuration, the rotating coordinate converting circuit 4b performs the operations by the above listed equations (2) through (5) and outputs the d-axis component $i_{d6}$ ($i_{dh}$) and q-axis component $i_{q6}$ ($i_{qh}$) of the required 6n-order harmonic current vector.

Amplifiers $A_1$ and $A_2$ shown in FIG. 4 have large input impedances and amplitudes. Input resistors $R_1$ and $R_2$ are provided for the amplifiers $A_1$ and $A_2$ respectively. The combination of the resistor $R_2$ with the capacitor C and the resistor $R_4$ respectively form a feedback impedance circuits for the amplifiers $A_1$ and $A_2$ to form an operation amplifier circuits with the amplifiers $A_1$ and $A_2$. A predetermined phase difference (30 degrees according to the present embodiment) can be generated between the input and output signals of each of the phase shifters shown in FIG. 3 by appropriately selecting constants of each resistor and capacitor.

FIG. 2 shows the second embodiment of the present invention. In the second embodiment, the control where the object current to be absorbed in the synchronous machine is a 6n±1 order harmonic current in the system is performed as an example. The second embodiment is different from the first embodiment in the position of the current transformer used in detecting the harmonic current and in the circuit configuration of the excitation control device. Of the components shown in FIG. 2, the units having the same functions as those in the first embodiment are assigned the same reference numbers, and the detailed explanation is omitted.

A current transformer 8 according to the a present embodiment detects a load current $i_t$ formed by the output current $i_h$ of the harmonic source 3 and the armature current $i_g$ of the synchronous machine 1.

An excitation control device 5 for controlling the synchronous machine 1 receives a detection signal of the rotating phase sensor 6 for detecting the phase of the spin axis interlocking at the excitation pole position of the synchronous machine 1 and a detection signal of the current transformer 8, and provides a required excitation current for the synchronous machine. The excitation control device 5 comprises an A/D converter 5f for both input signals; a harmonic detecting unit 5g; a rotating coordinate converter 5h; an integration process unit 5i; a waveform memory unit 5m; a phase lock loop (PLL) circuit 5j; an address counter 5k; a D/A converter 5n; and a power amplifier 5p. The functions of the harmonic detecting unit 5g, rotating coordinate converter 5h, and integration process unit 5i can be processed in a microcomputer. The rotating coordinate converter 5h, integration process unit 5i, waveform memory unit 5m, D/A converter 5n, and power amplifier 5p form a control unit 9'.

The harmonic detecting unit 5g comprises a Fourier transform circuit. The harmonic detecting unit 5g selectively detects the 6n±1 order harmonic current signal in the load current $i_t$ by Fourier-transforming the detection signal from the current transformer 8 A/D-converted through the A/D converter 5f based on the phase signal from the rotating phase sensor 6.

The rotating coordinate converter 5h has the same function as the rotating coordinate converting circuit 4b shown in FIG. 1 and calculates the amplitude and phase of the 6n-order harmonic $i_f$ required for the excitation of the synchronous machine 1.

The integration process unit 5i stores the data of the amplitude and phase of the 6n-order harmonic current currently transmitted by the rotating coordinate converter 5h, modifies the stored data by sequentially adding the data of the amplitude and phase sequentially transmitted by the converter 5h; and composes a waveform for one cycle of the 6n-order harmonic current $i_f$ using the amended data according to equation (6).

The composed waveform data transmitted from the integration process unit 5i is written to the waveform memory unit 5m. Then, the waveform data is read from the waveform memory unit 5m based on the address specified by the address counter 5k in PLL-synchronism with the rotating phase signal from the rotating phase sensor 6. The read waveform data is input to the D/A converter 5n and converted into an analog waveform signal. The D/A-converted waveform data is further amplified by the power amplifier 5p.

The output of the power amplifier 5p is a required synchronous machine excitation current and provided for the field winding 1b.

The coefficient K in each of equations (5) and (6) is set to an appropriate value by adjusting the gain through the rotating coordinate converter 5h and/or power amplifier 5p.

According to the second embodiment, the absorption control of the 6n±1 order harmonic current in the system by the synchronous machine 1 can be a feedback control. In this case, the absorption control is continued by the integration process unit 5*i* until the integration of the unprocessed portion in absorbing the harmonics reaches zero.

FIG. 5 shows the circuit of the fundamental current excitation system for generating the direct excitation current for the fundamental current voltage in the synchronous machine 1.

The fundamental current exciting system comprises a fundamental current excitation control device 10; voltage setting unit 11; meter transformer 12; excitation source transformer 13; and an armature winding 1*a*. The fundamental current excitation control device 10 provides an automatic voltage regulator (AVR) with the deviation between the fundamental current voltage set value of the voltage setting unit 11 and the fundamental current output voltage of the synchronous machine 1 detected by the meter transformer 12. According to the control command signal output from the AVR, the fundamental current excitation control device 10 outputs an excitation voltage $V_{DC}$ by gate-controlling a thyristor which forms, for example, a mixed bridge. Through the excitation voltage $V_{DC}$, a required excitation current is provided for the field winding of the synchronous machine 1, and the fundamental current output voltage of the synchronous machine 1 is maintained at the voltage specified by the voltage setting unit 11.

FIG. 6 shows the circuit of the excitation system which is a combination of the fundamental current excitation system and the harmonic excitation control system for the synchronous machine 1. The excitation system is formed by combination of the excitation system shown in FIG. 1 or 2 and FIG. 5 with an excitation synthesizing unit 20. In the excitation system, a 3-phase balanced winding is provided on the rotor of the synchronous machine 1 as a field winding 1*c* of the synchronous machine 1.

The excitation synthesizing unit 20 comprises a chalk coil 21; an output transformer 22 for receiving the harmonic output voltage $V_{ACO}$ of the excitation control device 4 or 5, dividing the voltage into voltages $V_{AC1}$ and $V_{AC2}$, and outputting them; a phase capacitor 23; and a resonant capacitor 24. In the excitation synthesizing unit 20, the output of the fundamental current excitation control device 10, that is, the excitation voltage $V_{DC}$, is applied to the winding for a single phase of the field winding 1*c* through the chalk coil 21. Simultaneously, the harmonic output voltage $V_{AC2}$ is applied through the resonant capacitor 24 in parallel with the excitation voltage $V_{DC}$. Furthermore, the harmonic output voltage $V_{AC1}$ is applied to the windings of the remaining two phases through the phase capacitor 23.

FIG. 7 shows the circuit of the excitation synthesizing system whose excitation synthesizing state is represented by the output from the fundamental current and harmonic excitation systems corresponding to the excitation synthesizing unit 20 shown in FIG. 6. As shown in FIG. 7, for example, the U-phase winding of the field winding 1*c* is used as a direct current excitation winding for generating the fundamental current voltage for the synchronous machine 1.

To generate the 6n-order fundamental current voltage for the synchronous machine 1, the harmonic excitation voltage $V_{AC2}$ is applied to the U-phase winding of the field winding 1*c* through the resonant capacitor 24. Simultaneously, harmonic excitation voltage $V_{AC1}$ is applied to the serial windings of the V-phase winding and W-phase winding of the field winding 1*c* through the phase capacitor 23.

With the above described configuration, the chalk coil 21 prevents the harmonic voltage $V_{AC2}$ from flowing through the direct current excitation system. The resonant capacitor 24 minimizes the input impedance for the voltage $V_{AC2}$ and avoids the phase delay through the resonance with the U-phase winding reactance of the field winding 1*c*. Furthermore, the phase capacitor 23 sets the voltage $V_{AC1}$ to lead by 90 degrees in phases.

Since the U-phase winding of the field winding 1*c* is orthogonal to the V-phase and W-phase series windings in a state of generating the magnetic flux and the voltage $V_{AC2}$ and the 90°-phase-shifted voltage $V_{AC1}$ are applied to the above described windings with the voltage ratio of $\frac{1}{3}^{1/2}$, the field winding 1*c*, which forms a 3-phase balanced winding, generates the rotating field having the rotating speed of 6nf. Using the rotating field, the required 6n-order harmonic voltage is generated in the armature winding of the synchronous machine 1.

With the excitation control device according to the present invention;

1) A predetermined order harmonic current in the system current, which badly affects the function of the synchronous machine, can be absorbed by controlling the excitation of the synchronous machine;

2) Calculations required for obtaining the synchronous machine excitation current can be greatly simplified because the rotating coordinate converting circuit performs the calculations on the orthogonal 2-axis coordinate system in the rotating coordinate system rotating at an angular frequency of the fundamental current in the electric power system;

3) In calculating values required for the synchronous machine excitation current, an output signal from the rotating coordinate converter, that is, values required for the excitation current of the synchronous machine, is sequentially modified by the integration process unit until the system harmonic current of a predetermined order is completely absorbed by the synchronous machine. Therefore, the required system harmonic current can be absorbed at a high level; and 4) Since a harmonic current of a predetermined order in the system current can be separated and detected by Fourier-transforming an A/D-converted signal in a microcomputer, the detection precision for the harmonic current of a specified order can be enhanced, and a smaller circuit can be designed.

What is claimed is:

1. A control device for controlling an excitation of a rotating field synchronous machine connected to an electric power system, comprising:

harmonics detecting means for detecting a specified harmonic component superposed onto a system current flowing between the electric power system and the synchronous machine as a harmonics detection signal; and control means for controlling an excitation current of the synchronous machine according to the harmonic detection signal and a rotating phase detection signal, which indicates a rotating phase of a spin axis rotating with a position of an excitation pole of the synchronous machine, such that an armature current having a same amplitude as and opposite phase to the specified harmonic component flows in the synchronous machine.

2. The control device according to claim 1, wherein said control means comprises rotating coordinate converting means for 3-phase/2-phase-converting the harmonic detection signal detected as a 3-phase detection signal by said harmonic detecting means into orthogonal 2-axis components in a rotating coordinate system rotating at an angular frequency of a fundamental current of the electric power system; and said excitation current is controlled so as to have a harmonic current having an amplitude of a proportional value of a vector sum of opposite phase components of the orthogonal 2-axis components and rotating at an angular frequency indicating a difference of an order of 1 from an angular frequency of the specified harmonic component on the rotating coordinate system.

3. The control device according to claim 2, wherein said control means further comprises:

integration processing means for receiving an output signal from said rotating coordinate converting means, storing both an amplitude and a phase of the output signal as storage values, and adding an amplitude and a phase of the output signal sequentially calculated at predetermined time intervals to the storage value for modifying amending the storage value;

waveform memory means for storing a waveform for one cycle of the modified output signal and reading contents of the stored waveform in synchronism with the rotating phase; and D/A converting means for D/A-converting an output signal from said waveform memory means and outputting a conversion result as the excitation current.

4. The control device according to claim 1, further comprising:

A/D converting means for A/D-converting a current flowing between the synchronous machine and electric power system and outputting a conversion result as a current detection signal to said harmonic detecting means; wherein said harmonic detecting means comprises a Fourier transform means for receiving the current detection signal and the rotating phase detection signal and performing a predetermined expansion operation based on the rotating phase, and said Fourier transform means separates the specified harmonic components from the current detection signal.

5. The control device according to claim 1, wherein said specified harmonic component is a current of an order of 6n±1 of a fundamental current of the electric power system, and the excitation current is a current of an order of 6n of the fundamental current.

6. The control device according to claim 1, wherein said specified harmonic component is provided by harmonic source means.

7. A control method for controlling an excitation of a rotating field synchronous machine connected to an electric power system, including the steps of:

detecting as a harmonic detection signal a specified harmonic component superposed onto a system current flowing between the electric power system and the synchronous machine;

detecting as a rotating phase detection signal a rotating phase of a spin axis rotating with a position of an excitation pole of the synchronous machine; and controlling an excitation current of the synchronous machine according to the harmonic detection signal and the rotating phase detection signal such that an armature current having a same amplitude as and opposite phase to the specified harmonic component flows in the synchronous machine.

8. The control method according to claim 7, further including the steps of:

3-phase/2-phase-converting the harmonic detection signal detected as a 3-phase detection signal into orthogonal 2-axis components in a rotating coordinate system rotating at an angular frequency of a fundamental current of the electric power system, and outputting a conversion result as an output signal; and controlling the excitation current so as to have a harmonic current having an amplitude of a proportional value of a vector sum of opposite phase components of the orthogonal 2-axis components, and rotating at an angular frequency indicating a difference of an order of 1 from an angular frequency of the specified harmonic component on the rotating coordinate system.

9. The control method according to claim 8, further including the steps of:

storing both an amplitude and a phase of the output signal as storage values, and adding an amplitude and a phase of the output signal sequentially calculated at predetermined time intervals to the storage value for modifying the storage value;

storing a waveform for one cycle of the modified output signal;

reading contents of the stored waveform in synchronism with the rotating phase; and D/A-converting the read contents and outputting a conversion result as the excitation current.

10. The control method according to claim 7, further including the steps of:

A/D-converting a current flowing between the synchronous machine and the electric power system and outputting a conversion result as a current detection signal;

performing a predetermined expansion operation to the current detection signal based on the rotating phase; and separating the specified harmonic components from the current detection signal.

11. The control method according to claim 7, wherein said specified harmonic component is the current of an order of 6n±1 of a fundamental current of the electric power system, and the excitation current is the current of an order of 6n of the fundamental current.

12. A control device for controlling an excitation of a rotating field synchronous machine, comprising:

current detecting means for detecting a specified harmonic component superposed onto a system current flowing in a power system;

phase detecting means for detecting a rotating phase of an excitation pole of the synchronous machine; and control means for controlling an excitation current in the synchronous machine according to the detected specified harmonic component and the rotating phase such that an armature current having a same amplitude as and opposite phase to the specified harmonic component flows in the synchronous machine.

13. A control system for a rotating field synchronous machine, comprising:

a rotating field synchronous machine connected to an alternating current;

rotating phase detecting means for detecting a rotating phase of a rotor rotating with an excitation pole of the synchronous machine;

harmonic detecting means for selectively detecting a specified harmonic component from a current flowing in the alternating current system; and control means for controlling an excitation current of the synchronous machine according to detection signals of said rotating phase detecting means and harmonic detecting means such that an armature current having a same amplitude as and an opposite phase to the specified harmonic component flows in an armature of the synchronous machine.

14. A control device for controlling an excitation of a rotating field synchronous machine connected to an electric power system, comprising:

harmonics detecting means for detecting a specified harmonic component superposed onto a system current flowing between the electric power system and the synchronous machine as a harmonics detection signal; and control means for controlling an excitation current of the synchronous machine according to said harmonic detection signal and a rotating phase detection signal, which indicates a rotating phase of a spin axis rotating with a position of an excitation pole of the synchronous machine, such that an armature current having the same amplitude as and opposite phase to said specified harmonic component flows in the synchronous machine, said control means including rotating coordinate converting means for converting a phase of said harmonic detection signal into components in a rotating coordinate system rotating at an angular frequency of a fundamental current of the electric power system.

15. A control method for controlling an excitation of a rotating field synchronous machine connected to an electric power system, including the steps of:

detecting as a harmonic detection signal a specified harmonic component superposed onto a system current flowing between the electric power system and the synchronous machine;

detecting as a rotating phase detection signal a rotating phase of a spin axis rotating with a position of an excitation pole of the synchronous machine;

controlling an excitation current of the synchronous machine according to said harmonic detection signal and said rotating phase detection signal such that an armature current having the same amplitude as and opposite phase to said specified harmonic component flows in the synchronous machine; and converting a phase of said harmonic detection signal into components in a rotating coordinate system rotating at an angular frequency of a fundamental current of the electric power system, and outputting a conversion result as an output signal.

16. A control device for controlling an excitation of a rotating field synchronous machine, comprising:

current detecting means for detecting a specified harmonic component superposed onto a system current flowing in a power system;

phase detecting means for detecting a rotating phase of an excitation pole of the synchronous machine; and control means for controlling an excitation current in the synchronous machine according to said detected specified harmonic component and said rotating phase such that an armature current having the same amplitude as and opposite phase to said specified harmonic component flows in the synchronous machine, said control means including rotating coordinate converting means for converting a phase of a harmonic detection signal detected by said current detecting means into components in a rotating coordinate system rotating at an angular frequency of a fundamental current of the electric power system.

17. A control system for a rotating field synchronous machine, comprising:

a rotating field synchronous machine connected to an alternating current;

rotating phase detecting means for detecting a rotating phase of a rotor rotating with an excitation pole of the synchronous machine;

harmonic detecting means for selectively detecting a specified harmonic component from a current flowing in the alternating current system; and control means for controlling an excitation current of the synchronous machine according to detection signals of said rotating phase detecting means and said harmonic detecting means such that an armature current having the same amplitude as and an opposite phase to said specified harmonic component flows in an armature of the synchronous machine, said control means including rotating coordinate converting means for converting a phase of a harmonic detection signal detected by said harmonic detecting means into components in a rotating coordinate system rotating at an angular frequency of a fundamental current of the alternating current system.

* * * * *

UNITED STATES PATENT AND TRADEMARK OFFICE
CERTIFICATE OF CORRECTION

PATENT NO. : 5,886,493
DATED : March 23, 1999
INVENTOR(S) : Ueda et al.

It is certified that error appears in the above-identified patent and that said Letters Patent is hereby corrected as shown below:

ON THE TITLE PAGE:

Under "[22] Filing Date" delete "Mar. 12, 1996" and insert --Feb. 12, 1996-- therefor Under "[57] Abstract" delete "is." and insert --is-- therefor Column 1, line 25, delete "machine a" and insert --machine, -- therefor

UNITED STATES PATENT AND TRADEMARK OFFICE
CERTIFICATE OF CORRECTION

PATENT NO. : 5,886,493
DATED : March 23, 1999
INVENTOR(S) : Ueda et al.

It is certified that error appears in the above-identified patent and that said Letters Patent is hereby corrected as shown below:

Column 7, line 35, delete "signali$_{ch}$" and insert --signal i$_{ch}$-- therefor Signed and Sealed this Twenty-second Day of February, 2000

Attest:

Q. TODD DICKINSON

Attesting Officer

Commissioner of Patents and Trademarks